April 23, 1957  B. J. CHISM  2,789,834
TRAILER HITCH LOAD EQUALIZER
Filed July 29, 1955
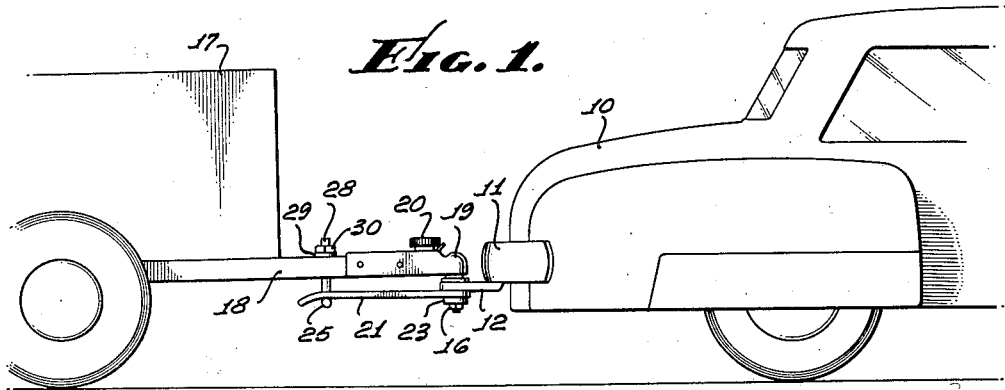
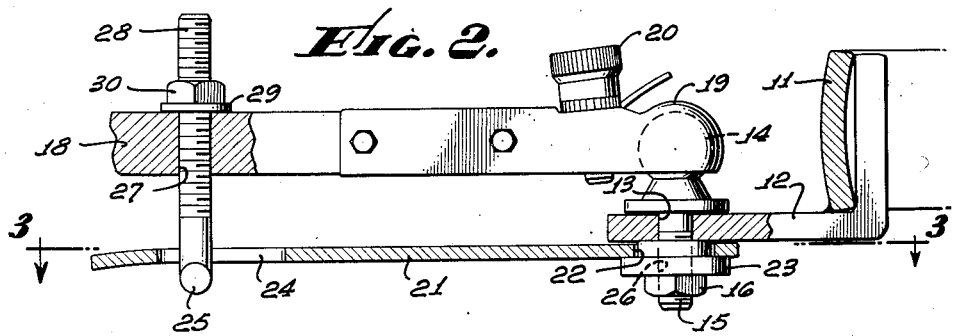
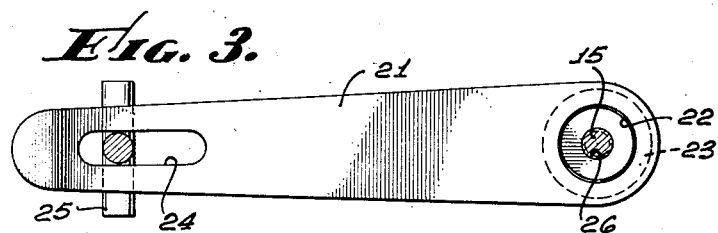
B. J. CHISM
INVENTOR.
BY
ATTORNEY.

United States Patent Office 2,789,834
Patented Apr. 23, 1957

2,789,834

TRAILER HITCH LOAD EQUALIZER

B. J. Chism, Lawndale, Calif.

Application July 29, 1955, Serial No. 525,247

4 Claims. (Cl. 280—406)

The invention relates to a trailer hitch construction, and more particularly to a new and improved construction for connecting a trailer to an automobile in such a manner that the trailer load is equalized between the trailer and the automobile.

The general object of the invention is to provide such a trailer hitch construction which can be easily used in connection with the conventional ball and socket trailer hitch forming a universal joint and is manually adjustable without the aid of jacks or accessories so as to properly distribute the trailer load on the wheels of the trailer and the automobile.

A further object of the invention is to provide a trailer hitch by means of which a drawbar on an automobile and the tongue of a trailer pivotally connected together by conventional means may be aligned by manual adjustment so that the trailer load is properly distributed between the trailer and the automobile.

A further object of the invention is to provide a trailer hitch which has a tension bar to maintain a drawbar on an automobile and the tongue of the trailer, which drawbar and tongue are pivotally connected, in substantially level alignment when the trailer makes turns or rides over bumps in the roadway so that the automobile maintains a substantially level position.

A still further object of the invention is to provide a trailer hitch construction which is composed of a minimum of parts, which is simple and inexpensive in construction, is easy to install and disassemble and which is readily adaptable for use in conjunction with the automobile-trailer hitches conventionally used.

My invention is of broad application and may be used to connect trailers of various kinds to various types of towing vehicles. It is particularly adaptable, however, for connecting two-wheeled trailers to automobiles.

The conventional trailer hitch consists of various constructions for pivotally connecting a drawbar secured to an automobile frame or bumper to a tongue of a trailer. In the case of two-wheeled trailers frequently the load in the trailer is unbalanced. When the unbalanced load is to the front of the trailer there is a tendency to depress the rear springs of the automobile and lower the rear of the vehicle, which in turn unbalances the weight of the automobile. If the unbalanced load is to the rear of the automobile there is a tendency to raise the front of the automobile rendering steering difficult. If the unbalanced load, however, is to the rear of the trailer there is a tendency to raise the rear of the automobile, again unbalancing the weight of the automobile by shifting the weight to the front of the vehicle. In either case it becomes difficult to control the operation and steering of the automobile while pulling the loaded trailer.

In the prior art, various constructions for correcting this problem have been put forward. Such attempts have led to expensive and complicated devices which have not solved the problem of balancing the trailer load.

In the accompanying drawings, I have illustrated, by way of example, but not by way of limitation, a specific embodiment of my invention. In such drawings, Fig. 1 is a side elevational view of one construction of the trailer hitch showing portions of the trailer and automobile; Fig. 2 is a view partly in cross-section; Fig. 3 is a view partially in cross-section taken along the line 3—3 of Fig. 2; and Fig. 4 is a perspective view of the spacer.

Referring more particularly to the drawings, in which similar reference characters identify similar parts in the several views, I will first describe a conventional trailer hitch, wherein 10 designates an automobile which has a rear bumper 11. Secured to the rear bumper 11 is a longitudinally extending drawbar 12 projecting rearwardly from the automobile. The drawbar 12, may, of course, be suitably attached to the frame of the automobile 10 rather than to the bumper 11, as shown. As shown in Fig. 2, the drawbar 12 has a hole 13 drilled therein to receive a trailer ball 14. The trailer ball 14 is attached to the drawbar 12, as shown in Fig. 2, by inserting the threaded shank 15 of the trailer ball 14 through the hole 13. In the conventional trailer hitch, a nut 16 is then tightly screwed on the shank 15 of the trailer ball 14. A conventional two-wheeled trailer 17 is provided with a tongue 18. The forward end of the tongue 18 is provided with a releasable socket portion 19 adapted to receive the trailer ball 14, as shown in Fig. 2 and is provided with locking means 20 for preventing the trailer ball 14 from becoming disengaged from the socket 19. The trailer ball 14 and the socket 19 form a universal joint between the drawbar 12 and the tongue 18.

The above-described type of conventional trailer hitch serving as a connection between an automobile and trailer is subject to the problem of overloading, i. e., if the two-wheeled trailer 17 is overloaded the drawbar 12 may be depressed, thus causing the rear of the automobile 10 to go down or, conversely, the rear of the automobile 10 may be raised upwards.

My invention eliminates both the downward and upward pressure on the drawbar 12 which results from overloading transmitted through the conventional ball and socket pivotal connection between the automobile 10 and the trailer 17 by distributing the weight evenly between the automobile 10 and the trailer 17.

My improved structure comprises a few simple parts which may be readily attached to the conventional trailer hitch to accomplish the desired weight distribution. In accordance with my invention I provide a tension bar 21 of spring steel, shown most clearly in Fig. 3. The tension bar 21 may be formed on a curve on an arc of a radius from 10 inches to 30 inches. The tension bar 21 has a hole 22 drilled near one extremity thereof, the hole 22 being adapted to receive a spacer 23 and the threaded shank 15 of the trailer ball 14. The spacer 23 is shown in Fig. 4. Near the other extremity, or free end, of the tension bar 21 is a slot 24 adapted to receive a T-Bolt 25.

My improved construction may be easily attached to the conventional trailer hitch, as follows: The nut 16 is unscrewed from the threaded shank 15 of the trailer ball 14. The spacer 23 is inserted in the hole 22 of the tension bar 21. The tension bar 21 with the spacer 23 positioned thereon is attached to the drawbar 12 of the automobile 10 by inserting the threaded shank 15 of the trailer ball 14 through the centrally disposed opening 26 of the spacer 23 and through the hole 22 of the tension bar 21. The nut 16 is then tightly screwed on the threaded shank 15 of the trailer ball 14 as shown in Fig. 2. A hole 27 is drilled in the trailer tongue 18, which hole 27 is of a size adapted to receive a T-Bolt 25. The threaded portion 28 of the T-Bolt 25 is inserted through the slot 24 of the tension bar 21 and through the hole 27 in the trailer tongue 18. A washer 29 is placed over the treaded portion 28 of the T-Bolt 25 and a nut 30 is screwed onto the threaded portion 28 of the T-Bolt 25 as shown in Fig. 2.

When the trailer 17 is overloaded the nut 30 is tightened or loosened, as required, thus causing the T-Bolt 25 to act upon the tension bar 21 until the load is equally distributed so that the trailer tongue 18 is in alignment with the drawbar 12, as shown in Figs. 1 and 2.

The tension bar 21 in Figs. 1 to 3 may be made of spring steel but it is obvious that any suitable metal having resilient characteristics or qualities may be used without departing from the spirit of my invention.

My invention permits the trailer to move horizontally, while at the same time permitting limited vertical movement when the trailer rides over bumps in the roadway. The tension bar, while yielding to a vertical stress, will cause the drawbar and tongue of the trailer to return to proper alignment when the automobile continues on a normal smooth roadway.

While I have shown in Figs. 1 and 2 a drawbar 12 attached to the bumper 11 of an automobile 10, certain trailer hitches conventionally used consist of clamps attached to the bumper 11. When such clamps are used with an overloaded trailer it is not uncommon for the clamps to be subjected to tensions and pressures whereby the bumper 11 becomes deformed and the clamps become disengaged. My invention when used in connection with such clamps, by maintaining the proper alignment between the trailer tongue and the attachment to the bumper eliminates the tensions and pressures on the clamp thereby avoiding deformation of the bumper and disengagement of the clamps. It will be obvious that my invention may be adapted to various trailer hitch constructions without departing from the spirit of my invention.

It will be apparent from the above description that I have provided a novel combination whereby at all times during the hauling of a trailer by an automobile, after the initial adjustment of the load, the tongue and drawbar of the automobile remain in level alignment. The parts of my novel trailer hitch construction may be readily attached to the conventional trailer hitch and easily disassembled when the hitch is not in use.

While I have described a particular embodiment of my inventive structure, it is clear that various changes may be made without departing from the spirit of my invention.

I claim:

1. An automobile trailer hitch comprising a drawbar secured to an automobile, pivot means secured to said drawbar including a ball-shaped member having a threaded shank, a tongue secured to a trailer, said tongue having a socketed portion connected to the forward extremity of said tongue and secured to said ball-shaped member forming a universal joint between said drawbar and tongue, a resilient tension bar pivotally supported at one end thereof on the threaded shank of said ball-shaped member for horizontal rotation about the vertical axis of said ball-shaped member, and screw means secured to said trailer tongue and connected adjacent to the free end of said tension bar for raising or depressing said tension bar whereby the tension bar acts on the drawbar and tongue through the universal joint connection to align said drawbar and tongue to equalize the trailer load between the trailer and automobile.

2. The structure according to claim 1, wherein said screw means comprise a T-Bolt having a T-shaped head at one end and a pin having a threaded portion at the other end, the pin passing through an opening adjacent to the free end of said tension bar and through a hole in said trailer tongue, the T-shaped head of said T-Bolt bearing against said tension bar and a nut threaded on the threaded portion of said pin, said nut bearing against said trailer tongue.

3. An automobile trailer hitch for connecting an automobile and a trailer having a single set of wheels comprising a drawbar secured to an automobile, pivot means secured to said drawbar including a ball-shaped member having a threaded shank, a tongue secured to a trailer, said tongue having a socketed portion connected to the forward extremity of said tongue and secured to said ball-shaped member forming a universal joint between said drawbar and tongue and permitting limited universal movement to said tongue, a resilient tension bar pivotally supported at one end thereof on the threaded shank of said ball-shaped member for horizontal rotation about the vertical axis of said ball-shaped member, a spacer on said threaded shank of said ball-shaped member positioned between said drawbar and said tension bar to facilitate said horizontal rotation, and screw means secured to said trailer tongue and connected adjacent to the free end of said tension bar for raising or depressing said tension bar whereby the tension bar acts on the drawbar and tongue through the universal joint connection to align said drawbar and tongue to equalize the trailer load between the trailer and automobile.

4. An automobile trailer hitch for connecting an automobile and a trailer having a single set of wheels comprising a longitudinal drawbar projecting rearwardly of the automobile, a universal joint connection secured to said drawbar including a ball-shaped member having a threaded shank, a longitudinal tongue projecting forwardly of the trailer and having a socketed portion connected to the forward extremity of said tongue and secured to said ball-shaped member permitting limited universal movement to said tongue, a resilient curved tension bar pivotally supported at one end thereof on the threaded shank of said ball-shaped member for horizontal rotation about the vertical axis of said ball-shaped member, a spacer on said threaded shank of said ball-shaped member positioned between said drawbar and said tension bar to facilitate said horizontal rotation, and a threaded bolt secured to said trailer tongue and connected adjacent to the free end of said tension bar for raising or depressing said tension bar whereby the tension bar acts on the drawbar and tongue through the universal joint connection to align said drawbar and tongue to equalize the trailer load between the trailer and automobile.

References Cited in the file of this patent

UNITED STATES PATENTS

| | | |
|---|---|---|
| 2,453,941 | Smit | Nov. 16, 1948 |
| 2,546,206 | Arehart | Mar. 27, 1951 |
| 2,597,657 | Mathisen | May 20, 1952 |
| 2,709,604 | Hartman | May 31, 1955 |
| 2,715,034 | Cornwall | Aug. 9, 1955 |